United States Patent [19]
Iwata et al.

[11] Patent Number: 5,755,145
[45] Date of Patent: May 26, 1998

[54] ROTARY DEVICE FOR ENGINE

[75] Inventors: Kazuyuki Iwata; Takehiko Sayama, both of Wako, Japan

[73] Assignee: Honda Giken Kogyo Kabushiki Kaisha, Tokyo, Japan

[21] Appl. No.: 715,332

[22] Filed: Sep. 18, 1996

[30] Foreign Application Priority Data

Sep. 21, 1995 [JP] Japan .................. 7-243428
Sep. 21, 1995 [JP] Japan .................. 7-243429

[51] Int. Cl.$^6$ ........................................ F16C 3/04
[52] U.S. Cl. ...................... 74/604; 74/603; 74/606 R
[58] Field of Search .................. 74/603, 604, 573 R; 123/572

[56] References Cited

U.S. PATENT DOCUMENTS

| | | | |
|---|---|---|---|
| 1,898,459 | 2/1933 | Newcomb | 74/604 |
| 2,688,839 | 9/1954 | Daub | 74/604 |
| 2,838,957 | 6/1958 | Johnson | 74/604 |
| 2,914,137 | 11/1959 | Sykes | 74/604 |
| 4,000,666 | 1/1977 | Ito et al. | 74/604 |
| 4,028,963 | 6/1977 | Nakamura et al. | 74/604 |
| 4,074,589 | 2/1978 | Nakamura et al. | 74/604 |
| 4,690,111 | 9/1987 | Kohno et al. | 74/604 X |
| 4,696,267 | 9/1987 | Kohno et al. | 123/572 X |
| 4,856,486 | 8/1989 | Mori et al. | 123/572 |

FOREIGN PATENT DOCUMENTS

63-23624  3/1984  Japan .

*Primary Examiner*—Vinh T. Luong
*Attorney, Agent, or Firm*—Armstrong, Westerman, Hattori, McLeland & Naughton

[57] ABSTRACT

A reduction in size and weight of an engine block is achieved by the described balancer shaft arrangement in which the balancer shaft bearing balancer weights at opposite ends is rotatably mounted in a pipe member fixedly attached to an exterior wall of the engine block. The balancer shaft contains an axial opening which communicates with the lubricating oil supply system of the engine in order to conduct lubricating oil to associated parts of the arrangement.

21 Claims, 8 Drawing Sheets

ROTARY DEVICE FOR ENGINE

BACKGROUND OF THE INVENTION

1. Field of the Invention

The present invention relates to a rotary device, and more particularly, to a balancer device for an engine, comprising a balancer shaft provided with balancer weights and rotatably supported in an engine block, the balancer shaft being rotated synchronously with a crankshaft, thereby reducing the vibration of the engine.

2. Description of the Related Art

In a conventional balancer device for an engine, the balancer shaft is accommodated in an interior of an engine block and is connected to the crankshaft of the engine through a timing belt or a gear (see, for example, Japanese Utility Model Publication No. 63-23624).

However, if the balancer shaft is accommodated in the interior of the engine block, there is a problem that the engine block is increased in both size and weight. In the case of a primary balancer, it is possible to lighten the balancer weight as a distance between two balancer weights provided at opposite ends of the balancer shaft is increased. However, hitherto, because the engine block, is integrally provided with a support portion for the balancer, there is a restriction in design for a mounting place for the balancer weight and thus, it is difficult to dispose the balancer weight at the optimal position.

SUMMARY OF THE INVENTION

The present invention has been accomplished in view of the above circumstances, and it is an object of the invention to lighten the engine block and the balancer weight by appropriately disposing the balancer shaft.

To achieve the above object, according to a first aspect of the present invention, there is provided a balancer device for an engine, comprising a balancer shaft having balancer weights and being rotatably supported by an engine block, said balancer shaft being rotated synchronously with a crankshaft, thereby reducing a vibration of the engine, wherein at least a portion of the balancer shaft is disposed outside a side wall of the engine block, and said balancer shaft being accommodated in an interior of a pipe member supported by the engine block.

With the above arrangement, it is possible to reduce both the size and the weight of the engine block as compared with a case in which the entire balancer shaft is disposed within the engine block, and it is also possible to protect the balancer shaft by the pipe member.

According to a second aspect of the invention, there is provided a balancer device for an engine, comprising a balancer shaft having balancer weights and being rotatably supported in an engine block, the rotation of a crankshaft being transmitted to said balancer shaft through an intermediate shaft, thereby reducing vibration of the engine, wherein at least a portion of the balancer shaft is disposed outside a side wall of the engine block, the balancer shaft being accommodated in an interior of a pipe member supported in the engine block, the balancer shaft being formed with an oil passage therein for lubricating journals of the balancer shaft, and an opening at an axial end of the oil passage communicating with another oil passage which supplies lubricating oil from an oil pump to the intermediate shaft.

With the above arrangement, it is possible to reduce both the size and the weight of the engine block as compared with a case in which the entire balancer shaft is disposed within the engine block, and it is also possible to protect the balancer shaft by the pipe member. It is further possible to lubricate the balancer shaft by utilizing an oil passage for lubricating an intermediate shaft. Furthermore, because the lubricating oil is supplied from an opening at an axial end of the balancer shaft, it is possible to effectively supply the lubricating oil without being affected by the centrifugal force of the rotation of the balancer shaft.

According to a third aspect of the invention, there is provided a balancer device for an engine, comprising a balancer shaft having balancer weights and being rotatably supported by an engine block, the balancer shaft being rotated synchronously with a crankshaft, thereby reducing vibration of the engine, wherein at least a portion of the balancer shaft which extends in an axial direction of the crankshaft is disposed outside of a side wall of the engine block, and the balancer shaft is accommodated in an interior of a pipe member supported by the engine block.

With the above arrangement, it is possible to reduce both the size and the weight of the engine block as compared with a case in which the entire balancer shaft is disposed within the engine block, and it is also possible to protect the balancer shaft by the pipe member.

The above and other objects, features and advantages of the invention will become apparent from the following detailed description of a preferred embodiment taken in conjunction with the accompanying drawings.

BRIEF DESCRIPTION OF THE DRAWINGS

FIGS. 1 to 8 shows an embodiment of the present invention, wherein:

DETAILED DESCRIPTION OF THE PREFERRED EMBODIMENT

Figure 1:
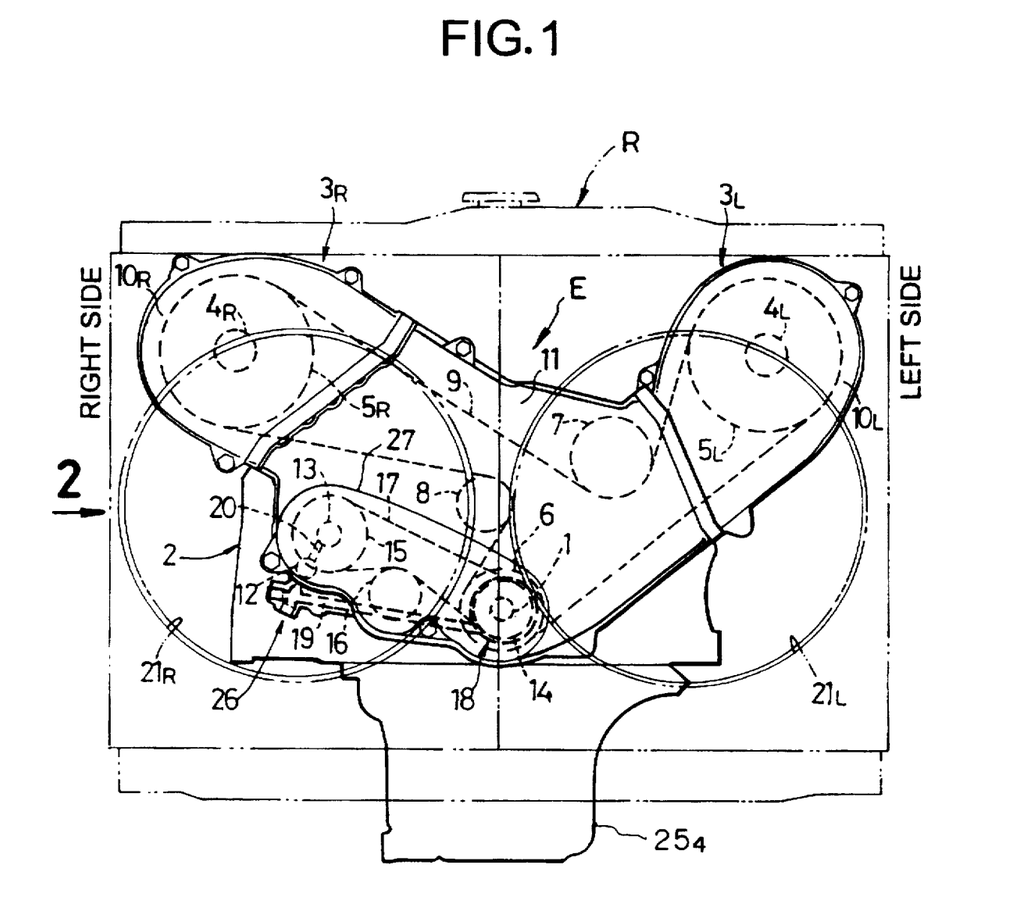
FIG. 1 is a front view of a vertical type V-shaped engine.

FIG. 1 shows an engine block 2 of a vertical type V-shaped 6-cylinder engine in which a crankshaft 1 is disposed in a longitudinal direction of a vehicle body. The engine block 2 is provided at its upper portion with a left bank $3_L$ extending leftward of the vehicle body and a right bank $3_R$ extending rightward of the vehicle body. A timing belt 9 is wound around a cam shaft driven pulley $5_L$ provided on a cam shaft $4_L$ which is supported in the left bank $3_L$; a cam shaft driven pulley $5_R$ provided on a cam shaft $4_R$ which is supported in the right bank $3_R$; a cam shaft drive pulley 6 provided on the crankshaft 1; and two tension pulleys 7 and 8.

Front surfaces of the cam shaft driven pulley $5_L$ of the left bank $3_L$ and the cam shaft driven pulley $5_R$ of the right bank $3_R$ are covered with left and right timing belt upper covers $10_L$ and $10_R$, respectively. Front surfaces of the tension pulleys 7 and 8 are covered with a timing belt lower cover 11 which is continuously formed to the timing belt upper covers $10_L$ and $10_R$.

Figure 3:
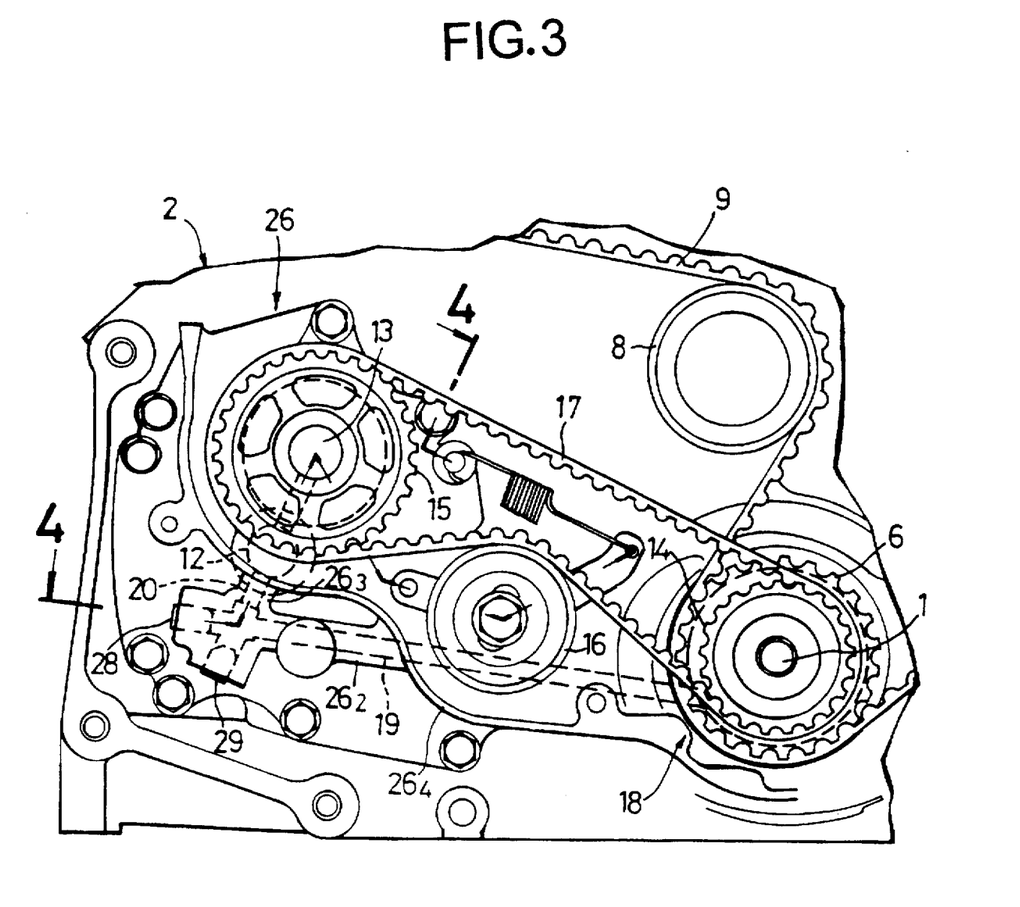
FIG. 3 is a view taken along the arrow 3 in FIG. 2.

Referring also to FIG. 3, a balancer shaft 12 is supported below the right bank $3_R$ in parallel with the crankshaft 1, and is driven by the crankshaft 1 through an intermediate shaft 13 which will be described hereinafter. A timing belt 17 is wound around a balancer shaft drive pulley 14 provided on the crankshaft 1; a balancer shaft driven pulley 15 provided on the intermediate shaft 13; and a tension pulley 16. A driving force of the crankshaft 1 is transmitted to the balancer shaft 12.

A first oil passage 19 extends rightward of the vehicle body from an oil pump 18 driven by the crankshaft 1. A second oil passage 20 extending upward from the end of the first oil passage 19 communicates with the balancer shaft 12 and the intermediate shaft 13. A radiator R is disposed in front of the engine E, and includes left and right fan openings $21_L$ and $21_R$. The first and second oil passages 19 and 20 are located within a rear projection area of the fan opening 21R on the right side of the vehicle body. With this arrangement, lubricating oil can be cooled by cooling air passing through the fan opening $21_R$.

Figure 2:
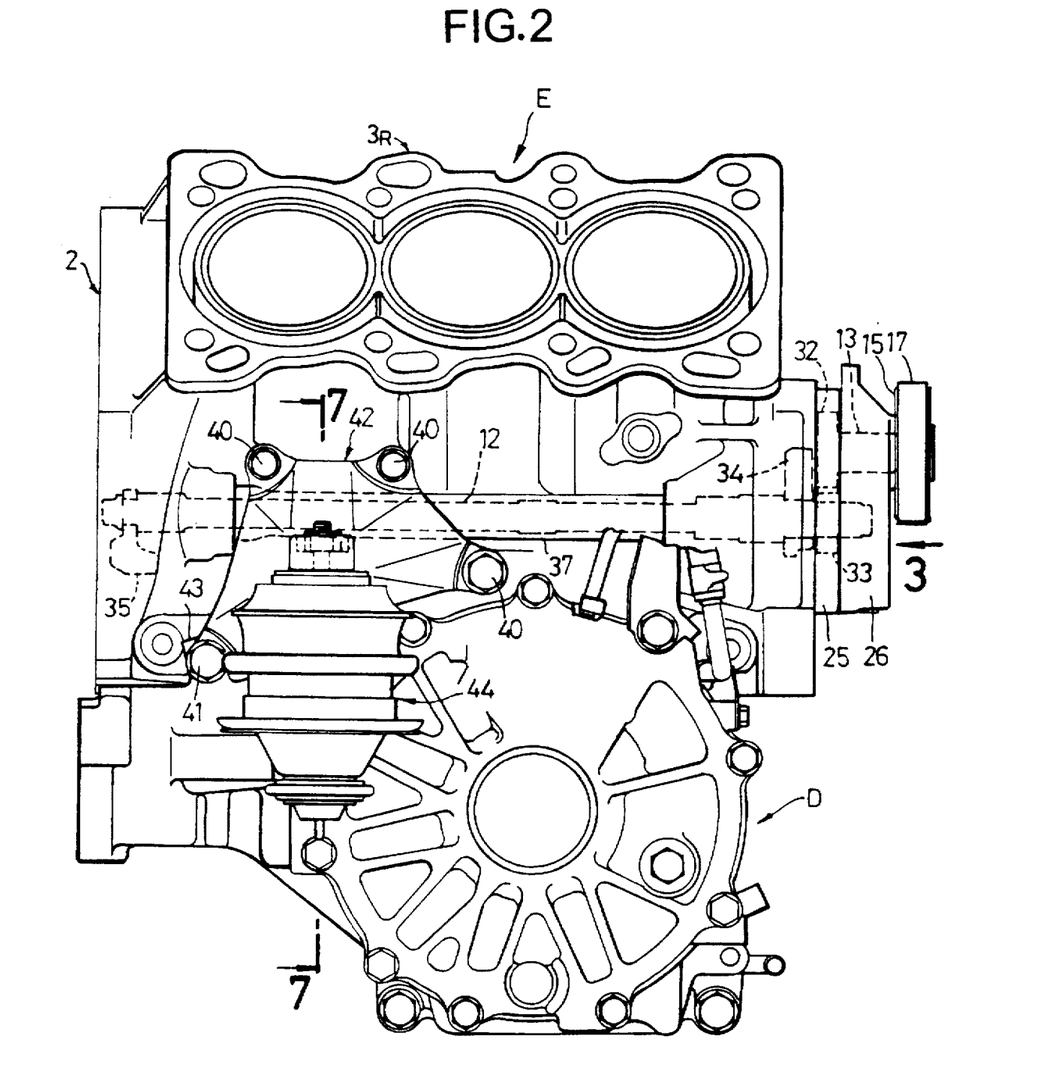
FIG. 2 is a view taken along the arrow 2 in FIG. 1.
Figure 4:
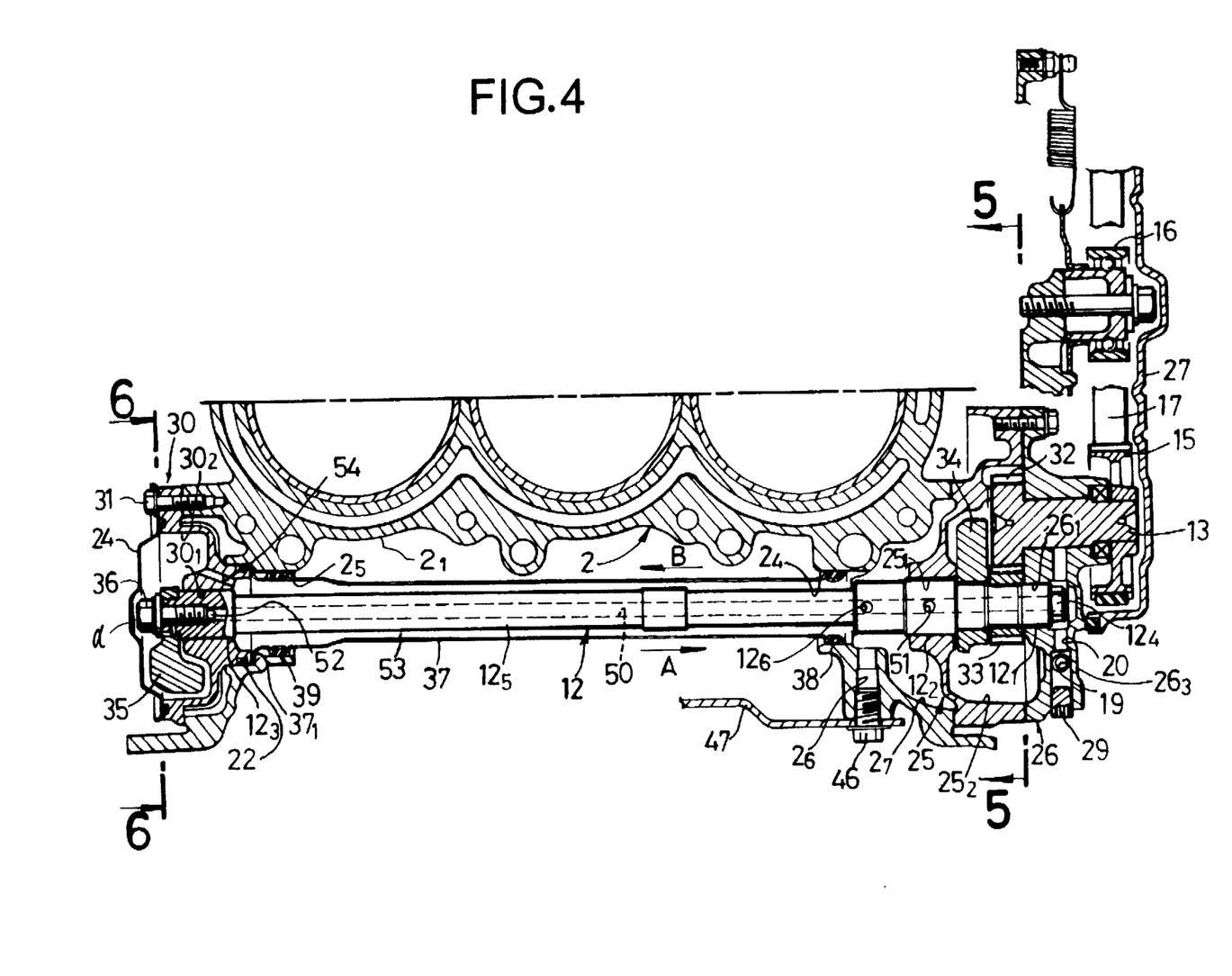
FIG. 4 is a sectional view taken along the line 4—4 in FIG. 3.

As shown in FIGS. 2 to 4, an oil pump body 25 and a gear case 26 are superposed on a front surface on the right side of the engine block 2. A timing belt cover 27 is superposed on a mating surface $26_4$ formed on a front surface of the gear case 26. The first and second oil passages 19 and 20 are formed within ribs $26_2$ and $26_3$, respectively, which protrude from a front surface of the gear case 26. A downstream end of the first oil passage 19 and an upstream end of the second oil passage 20 are closed by plugs 28 and 29, respectively (see FIG. 3). When the timing belt cover 27 is superposed on the front surface of the gear case 26, a portion of the gear case 26 is exposed to a front side of the vehicle body. Portions of the first and second oil passages 19 and 20 face the exposed portion of the gear case 26 (see FIG. 1), and the first and second oil passages 19 and 20 are formed within the ribs $26_2$ and $26_3$, respectively, as described above. Therefore, it is possible to enhance the cooling efficiency of the lubricating oil by cooling air.

The balancer shaft 12 is disposed in the longitudinal direction of the vehicle body along the outside of the right side of the engine block 2. First and second journals $12_1$ and $12_2$ are formed on the front side (right side in FIG. 4) of the balancer shaft 12, and a third journal $12_3$ is formed on the rear side (left side in FIG. 4) of the balancer shaft 12. The first journal $12_1$ is supported on a journal bearing $26_1$ formed on the gear case 26 as a shaft holder. The second journal $12_2$ is supported on a journal bearing $25_1$ formed on the oil pump body 25 as a shaft holder. A shaft holder 30 is fixed by a bolt 31 on a rear end of the engine block 2 through a seal member 22. The third journal $12_3$ is supported on a journal bearing $30_1$ formed in the shaft holder 30.

A drive gear 32 is integrally formed on a rear end of the intermediate shaft 13 which is supported in the gear case 26. The drive gear 32 meshes with a driven gear 33 which is press-fitted in a rear side of the first journal $12_1$ of the balancer shaft 12. A gear ratio between the balancer shaft drive pulley 14 and the balancer shaft driven pulley 15, and a gear ratio between the drive gear 32 and driven gear 33 are set such that the balancer shaft 12 rotates at the same speed as the crankshaft 1. Because the drive gear 32 meshes with the driven gear 33, the balancer shaft 12 rotates in the opposite direction from the crankshaft 1.

Figure 5:
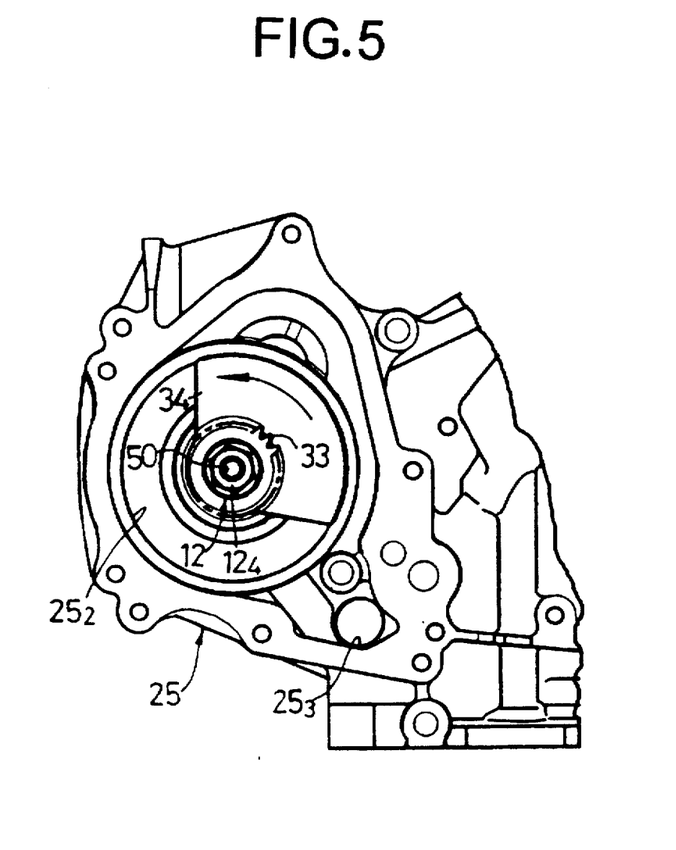
FIG. 5 is a view taken in the direction of the arrows along the line 5—5 in FIG. 4.

As is apparent from FIGS. 4 and 5, a substantially fan-shaped first balancer weight 34 is press-fitted and coupled between the driven gear 33 and the second journal $12_2$ of 20 the balancer shaft 12. The drive gear 32, the driven gear 33 and the first balancer weight 34 are accommodated in a recess defining a balancer weight accommodating chamber $25_2$ opened at a front surface of the oil pump body 25. A head $12_4$ is integrally formed on a front end of the balancer shaft 12. The head $12_4$ is shaped hexangular so that a machine tool can engage the head $12_4$.

Figure 6:
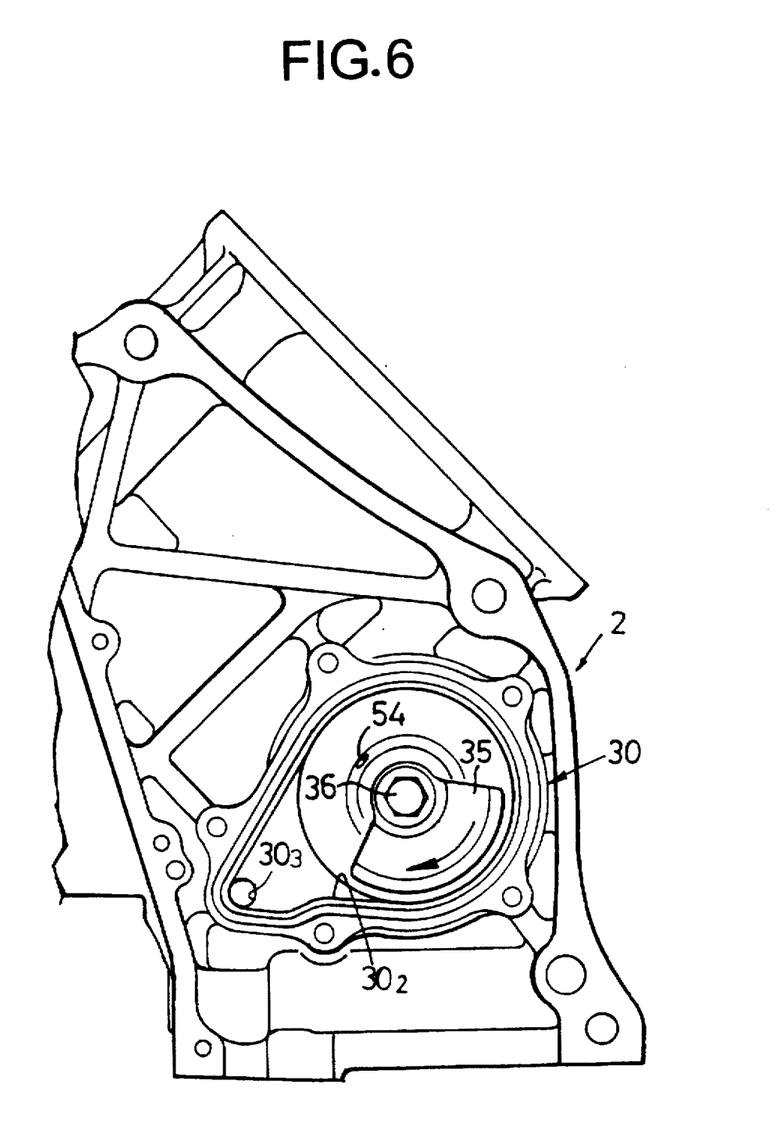
FIG. 6 is a perspective view taken in the direction of the arrows along the line 6—6 in FIG. 4.

As is apparent from FIGS. 4 and 6, a substantially fan-shafted second balancer weight 35 is fitted to a rear end of the balancer shaft 12 coupled thereto by a bolt 36. The second balancer weight 35 is accommodated in a recess $30_2$ formed in the shaft holder 30 and serving as a balancer weight accommodating chamber, and is covered with a cover 24 which is fixed to the block 2 at the rear end of the balancer shaft 12 by the bolt 31. The direction of the thread of the bolt 36 is opposite from that of the direction of rotation of the balancer shaft 12 so that the bolt 36 may not be loosened by the rotation of the balancer shaft 12. Further, an inner surface of the cover 24 faces the head of the bolt 36 via a small gap α. Therefore, even if the bolt 36 comes loose, the bolt 36 is prevented from coming out from the balancer shaft 12, which also prevents the second balancer weight 35 from coming out from the balancer shaft 12.

A central portion of the second balancer weight 35 (a portion of the second balancer shaft 35 which fits to the balancer shaft 12) is formed relatively thin, whereas, the outer peripheral portion of the second balancer weight 35 is formed relatively thick such as to extend axially forward and rearward. Especially, the thick portion of the second balancer weight 35, which extends axially forward, radially covers a portion of the outside of the journal bearing $30_1$ of the shaft holder 30 (FIG. 4 reference). It is obvious from the interior space of the recess $30_2$ defining a second balancer weight accommodating chamber formed in the shaft holder 30 that the size of the second balancer weight 35 is reduced in its diametral direction.

As is apparent from FIG. 4, a front end and a rear end of the pipe member 37 are fitted to a front support hole $2_4$ and a rear support hole $2_5$ formed in a side wall $2_1$ the engine block 2 through the seal member 38 and 39, respectively. An intermediate portion $12_5$ of the balancer shaft 12 is accommodated within the pipe member 37. A diameter of the front end of the pipe member 37 (i.e., a diameter of the front support hole $2_4$) is set smaller than a diameter of the rear end of the pipe member 37 (i.e., a diameter of the rear support hole $2_5$). Moreover, a diameter of the intermediate portion of the pipe member 37 is set smaller than diameters of the front and rear ends thereof.

Figure 7:
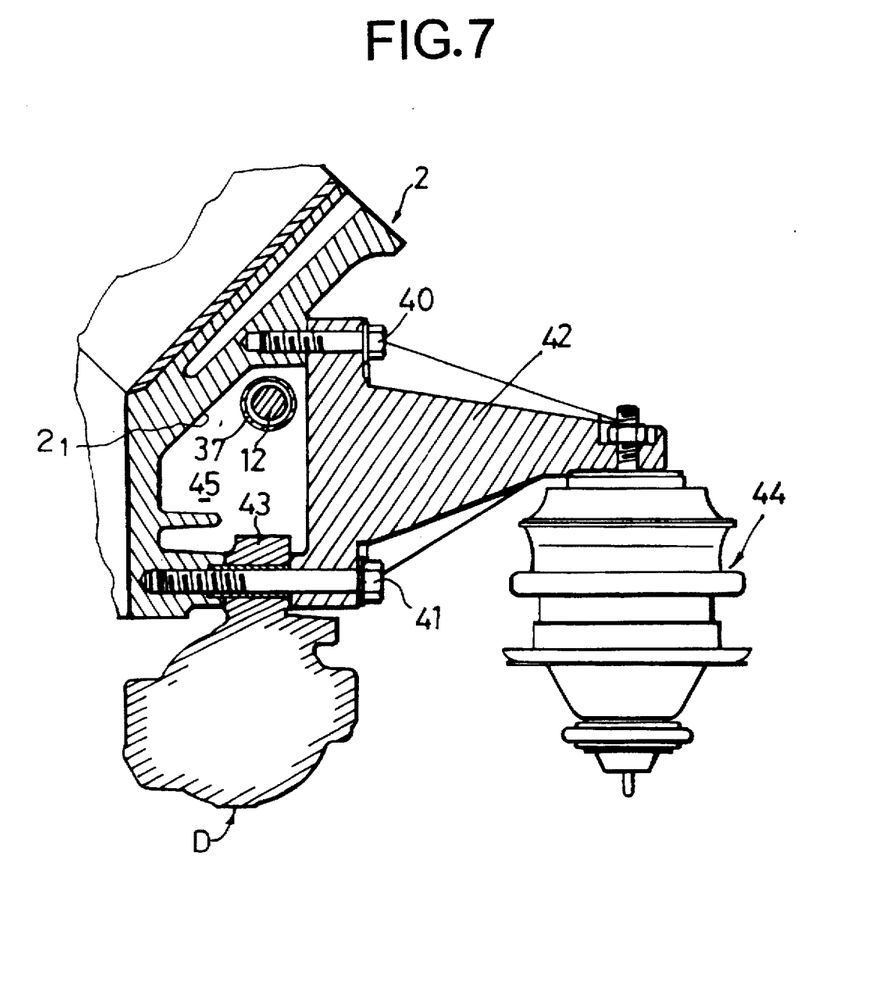
FIG. 7 is a sectional view taken along the line 7—7 in FIG. 2.

As is apparent from FIG. 2 and FIG. 7, a mount bracket 42 is coupled to a right side of the engine block 2 by four bolts 40 . . . , 41. By one of the bolts 41, a flange portion 43 projected from the differential D is also fastened between the engine block 2 and the mount bracket 42. The mount bracket 42 is supported by the vehicle body frame (not shown) through an engine mount 44. By disposing the balancer shaft 12 and the pipe member 37 in a space 45 formed between the side wall $2_1$ of the engine block 2 and the mount bracket 42, it is possible to cover and protect the outsides of the balancer shaft 12 and the pipe member 37.

As is apparent from FIG. 4, a machine tool insertion hole $2_6$ is formed in a front portion of the engine block 2. The machine tool insertion hole $2_6$ faces a machine tool insertion hole $12_6$ formed in the balancer shaft 12 so that phase-matching of the balancer shaft 12 can be conducted during assembling of the balancer device. An auxiliary equipment mounting bracket 47 (or a cover of an exhaust manifold), and the like, are fastened together by a sealing bolt 46 which closes the machine tool insertion hole $2_6$ of the engine block 2. The auxiliary equipment mounting bracket 47 functions as a protective covering for the balancer shaft 12 and the pipe member 37.

The balancer device is assembled in accordance with the following procedure.

Figure 8:
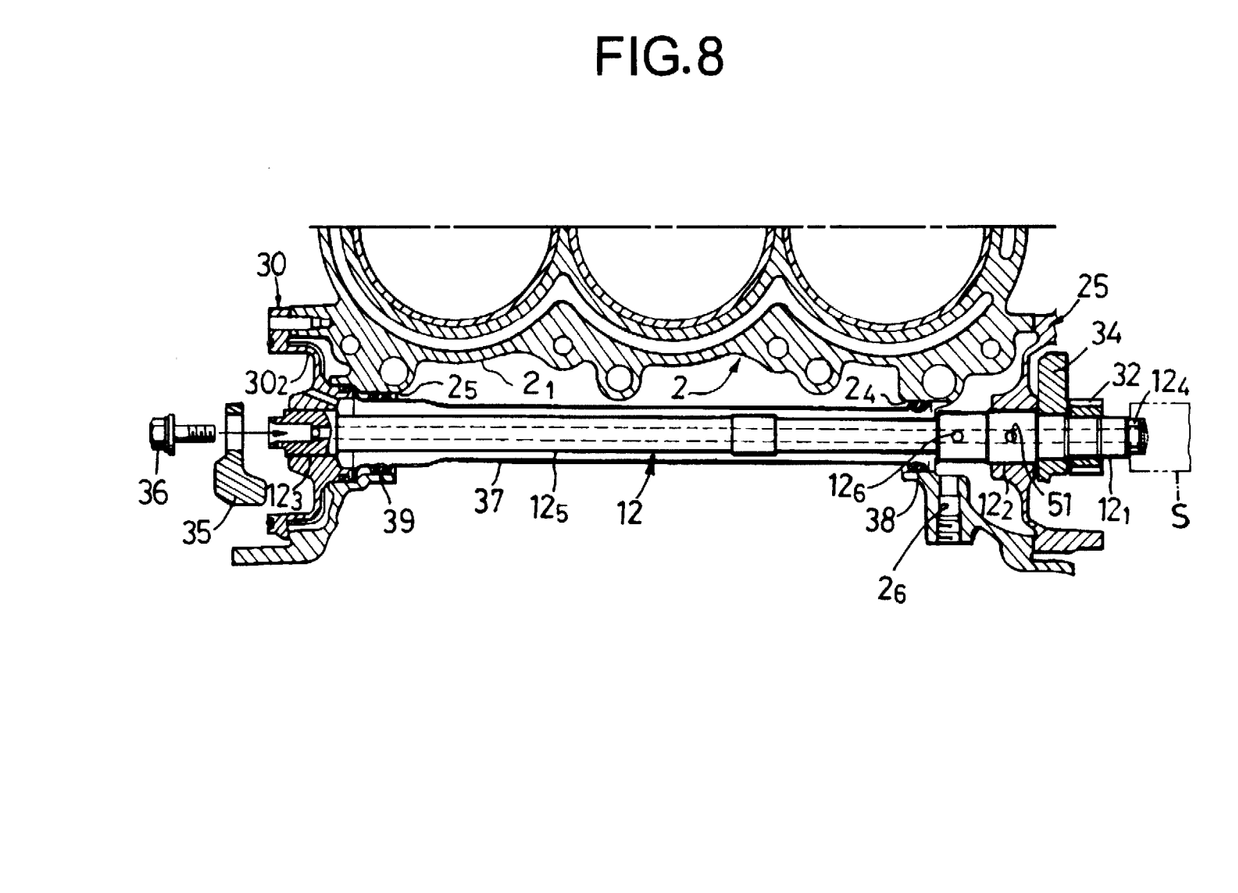
FIG. 8 is a view showing an assembling procedure of a balancer device.

Referring to FIGS. 4 and 8, the pipe member 37 is inserted into the front and rear support holes $2_4$ and $2_5$ of the cylinder portion of the engine block 2 in the direction of the arrow A in FIG. 4. At that time, the seal member 38 mounted on the front end of the pipe member 37 having a small diameter is first fitted to an inner periphery of the front support hole $2_4$. Then, the seal member 39, mounted on the rear end of the pipe member 37 having a large diameter, is fitted to an inner periphery of the rear support hole $2_5$. By inserting the two seal member 38 and 39 into the front and rear support holes $2_4$ and $2_5$ beforehand in this manner, it is possible to reduce the insertion load to facilitate the assembling operation.

Next, the oil pump body 25 is connected to a front end surface of the cylinder portion of the engine block 2, and the balancer shaft 12, into which the first balancer weight 34 and the driven gear 33 have previously been press-fitted, is inserted in the direction of the arrow B in FIG. 4. Then, the shaft holder 30 is connected to a rear end surface of the cylinder portion of the engine block 2, and the second balancer weight 35 is fixed on the rear end of the balancer shaft 12 by the bolt 36 to secure the cover 24 on the rear portion of the balancer shaft 12. When the shaft holder 30 is connected to a rear end surface of the cylinder portion of the engine block 2, the flange $37_1$ formed on a rear end of the pipe member 37 is clamped between a step portion of the engine block 2 and the front end of the shaft holder 30. With this arrangement, it is possible to position the pipe member 37 in the axial direction without using any special positioning member (see FIG. 4). In order to counter the fastening torque of the bolt 36 when the second balancer weight 35 is fixed, the hexangular head $12_4$ at the front end of the balancer shaft 12 is fixed by a spanner S to prevent the hexangular head $12_4$ from rotating. Because the head $12_4$ is hexangular in shape, it is possible to sufficiently insure a flow passage area for the lubricating oil flowing through the hexangular shaped head $12_4$.

Then, a pin-like tool is inserted into the tool insertion holes $2_6$ and $12_6$ of the engine block 2 and the balancer shaft 12, respectively, to set a phase of the balancer shaft 12. The drive gear 32 and the driven gear 33 are meshed with each other in this state. Thereafter, the gear case 26 is connected to the front surface of the oil pump body 25. After the timing belt 17 is wound around the balancer shaft drive pulley 14, the balancer shaft driven pulley 15 and the tension pulley 16, the machine tools are pulled out from the tool insertion holes $2_6$ and $12_6$, and the sealing bolt 46 is threadedly inserted into the tool insertion hole $2_6$ to complete the assembling of the balancer device.

Next, the lubrication of the balancer device will be explained.

As is apparent from FIG. 4, the third oil passage 50 passes through an interior of the balancer shaft 12 in the axial direction. A front end of the third oil passage 50 communicates with the second oil passage 20 which is formed in the gear case 26. The balancer shaft 12 is formed at its front portion with an oil bore 51 which extends radially from the third oil passage 50 and which communicates with an outer periphery of the second journal $12_2$. The balancer shaft 12 is also formed at its rear portion with an oil bore 52 which extends radially from the third oil passage 50 and which communicates with an outer periphery of the third journal $12_3$.

A fourth oil passage 53 is formed between an outer periphery of the balancer shaft 12 and an inner periphery of the pipe member 37. A front end of the fourth oil passage 53 communicates with the recess $2_7$ formed in the front end of the cylinder block 2, and a rear end of the fourth oil passage 53 communicates with the recess $30_2$ formed in the shaft holder 30.

The lubricating oil discharged from the oil pump 18 flows into the second oil passage 20 through the first oil passage 19 of the gear case 26 to lubricate an outer peripheral surface of the first journal $12_1$ of the balancer shaft 12, and to lubricate an outer peripheral surface of the intermediate shaft 13. A portion of the lubricating oil flowing through the second oil passage 20 flows into the third oil passage 50 of the balancer shaft 12 to lubricate an outer peripheral surface of the second journal $12_2$ of the balancer shaft 12 through the oil bore 51, and to lubricate an outer peripheral surface of the third journal 123 of the balancer shaft 12. Lubricating oil leaked from the first and second journals $12_1$ and $12_2$ into the recess $25_2$ of the oil pump body 25 is scooped up by the first balancer weight 34 which rotates in the direction of the arrow in FIG. 5, and is returned into an oil pan $25_4$ through an oil bore $25_3$ formed in a lower portion of the recess $25_2$ and an oil passage (not shown) formed in the engine block.

Lubricating oil leaked forward from the third journal $12_3$ and flowed into the pipe member 37 passes through the fourth oil passage 53 and reaches the recess $2_7$ of the cylinder block portion of engine block 2, and is returned therefrom into the oil pan $25_4$. Further, lubricating oil leaked rearward from the third journal $12_3$ and flowed into the recess $30_2$ of the shaft holder 30, or lubricating oil flowed from the fourth oil passage 53 into the recess $30_2$ of the shaft holder 30 through the oil bore 54 is scooped up by the second balancer weight 35, which rotates in the direction of the arrow in FIG. 6, and is returned into the oil pan through the oil bore $30_3$ formed in a lower portion of the recess $30_2$.

As described above, the third oil passage 50, which opens at the front end of the balancer shaft 12, communicates with an intermediate portion of the second oil passage 20 which supplies a lubricating oil to the intermediate shaft 13. Therefore, it is unnecessary to provide a special oil passage for supplying lubricating oil to the third oil passage 50 of the balancer shaft 12, and it is possible to smoothly supply lubricating oil to the third oil passage 50 of the balancer shaft 12 without being influenced by a centrifugal force caused by rotation of the balancer shaft 12. Moreover, because the first and second oil passages 19 and 20 are formed in the gear case 26, the formation of the oil passages 19 and 20 is easier as compared with a case in which these oil passages 19 and 20 are formed in the cylinder block 2.

When the engine E is operated and the crankshaft 1 is rotated, such rotation is transmitted to the balancer shaft 12 through the drive pulley 14, the timing belt 17, the driven pulley 15, the intermediate shaft 13, the drive gear 32 and driven gear 33, thereby rotating the balancer shaft 12 in the opposite direction and at the same speed as the crankshaft to suppress the primary vibration of the engine E.

Further, because the intermediate portion $12_5$ of the balancer shaft 12 is disposed outside the engine block 2, the engine block 2 is reduced in size and weight as compared with a case in which the entire balancer shaft 12 is disposed within the engine block 2. Moreover, the front end of the balancer shaft 12 is supported through the oil pump body 25 and gear case 26, which are separate from the engine block 2 and which are mounted on the front end surface of the engine block 2, and the rear end of the balancer shaft 12 is supported through the shaft holder 30, which is separate from the engine block 2 and which is mounted on the rear end surface of the engine block 2. Therefore, it is possible to sufficiently secure the journals $12_1$, $12_2$ and $12_3$ at opposite ends of the balancer shaft 12, and to easily support both the balancer weights 34 and 35 at appropriate locations, without largely changing the shape of the engine block 2. As a result, it is possible to sufficiently secure both the balancer weights 34 and 35 to reduce their weights. Furthermore, because both the balancer weights 34 and 35 are disposed in the vicinity of the journals $12_1$, $12_2$ and $12_3$, it is possible to stably support the balancer weights 34 and 35.

Although the embodiment of the present invention has been described in detail, it will be understood that the present invention is not limited to the above-described embodiment, and various modifications may be made without departing from the subject matter and scope of the invention defined in claims.

For example, although the primary balancer device for suppressing a primary vibration of the engine is described in the above embodiment, the present invention can also be applied to a secondary balancer device for suppressing a secondary vibration of the engine E. Or further, the present invention can also be applied to a rotary shaft other than a balancer, such as a rotary shaft for driving accessories.

What is claimed is:

1. A balancer device for reducing vibration of an engine, comprising:
    an engine block containing an elongated rotatable crankshaft,
    a hollow pipe member disposed externally of said engine block and extending substantially parallel to said crankshaft,
    said pipe member having end portions fixed to said engine block, and
    a balancer shaft disposed within said pipe member, and
    means for rotating said balancer shaft in response to rotation of said crankshaft.

2. A balancer device according to claim 1, further including shaft holders which are separate from said engine block and mounted on said engine block, wherein said balancer shaft is supported through said shaft holders.

3. A balancer device according to claim 1, wherein said balancer shaft is provided at opposite ends thereof with balancer weights and journals, said journals being supported by shaft holders which are separate from said engine block and mounted on opposite end surfaces of said engine block, and wherein positioning of said pipe member is effected by at least one of said shaft holders.

4. A balancer device according to claim 3, wherein diameters of shaft portions of said balancer weights are set smaller than a diameter of rotation of said balancer weight, and said shaft portions are disposed within said pipe member.

5. A balancer device according to claim 1, wherein opposite ends of said pipe member are supported by said engine block through seal members.

6. A balancer device according to claim 1, wherein a diameter of a shaft portion between journal portions of said balancer shaft is set smaller than those of said journal portions.

7. A balancer device according to claim 1, wherein a diameter of said pipe member at its front end portion, as viewed in its mounted direction, is set smaller than a diameter of said pipe member at its rear end portion, as viewed in its mounted direction.

8. A balancer device according to claim 7, wherein said pipe member is provided at its rear end portion with a flange portion, said flange portion being clamped between said engine block and a shaft holder for supporting said balancer shaft.

9. A balancer device according to claim 1, wherein an internal space of said pipe member communicates with an internal space of an oil pan mounted in said engine block.

10. A balancer device according to claim 1, wherein an internal space of said pipe member communicates with an internal space of a balancer weight accommodating chamber which accommodates said balancer weight.

11. A balancer device according to claim 10, wherein oil in said balancer weight accommodating chamber is circulated by rotation of said balancer weight.

12. A balancer device according to claim 1, said pipe member being disposed between said engine block and an engine mount bracket for mounting said engine block.

13. A balancer device according to claim 1, wherein said engine block is formed with a machine tool insertion hole which faces another machine tool insertion hole formed in said balancer shaft for matching a phase, and a bolt for mounting another member is fastened into said machine tool insertion hole formed in said engine block.

14. A balancer device according to claim 13, wherein said another member is an auxiliary equipment mounting bracket for covering said pipe member.

15. A balancer device according to claim 1, wherein said balancer shaft is disposed concentrically within said pipe member.

16. A balancer device for an engine having a crankshaft, comprising:
    an engine block,
    a rotatable balancer shaft provided with balancer weights,
    journal means including journals supported by said engine block and being operative to support said balancer shaft for rotation,
    an intermediate shaft accommodated by said engine block and being operative to transmit rotation of said crankshaft to said balancer shaft to reduce vibration of said engine,
    a pipe member supported by said engine block on the exterior thereof, said pipe member having means therein for supporting at least a portion of said balancer shaft, and
    means for lubricating said journal means including:
    an oil pump,
    a first oil passage operative to conduct lubricating oil extending through said balancer shaft,
    a second oil passage for supplying lubricating oil from said oil pump to said intermediate shaft, and
    an opening at an axial end of said first oil passage communicating with said second oil passage for supplying lubricating oil to said balancer shaft.

17. A balancer device according to claim 16, further including a gear case connected to an end of the engine block for supporting one end of said balancer shaft and operatively connecting said balancer shaft and said intermediate shaft with each other, said second oil passage being formed in said gear case, and one of said journals being provided on a front end of said balancer shaft and facing said second oil passage.

18. A balancer device according to claim 16, wherein said engine includes a radiator having a fan opening containing a space in which said first oil supply passage for said balancer shaft is disposed.

19. A rotary device for an engine having an engine block, comprising a rotary shaft rotatably supported by said engine block, said rotary shaft being rotated synchronously with a crankshaft, wherein at least a portion of the rotary shaft extends in a direction parallel to said crankshaft and is disposed outside a side wall of the engine block, and said rotary shaft being accommodated in an interior of a pipe member which is disposed externally of said engine block and supported by the engine block with end portions of the pipe member being fixed to said engine block.

20. A rotary device according to claim 19, further including balancer weights disposed at opposite ends of said rotary shaft, and journal means for supporting said balancer shaft for rotation, wherein shaft portions of said rotary shaft having diameters between said journals of said rotary shaft set smaller than diameters of rotation of said balancer weights, said diameters of said shaft portions being set smaller than diameters of said journal means, and said shaft portions are disposed in an interior of said pipe member.

21. A rotary device according to claim 20, wherein said rotary shaft is provided at opposite ends thereof with said balancer weights and journals, said journals being supported through shaft holders which are separate from said engine block and mounted on opposite end surfaces of said engine block, and wherein said pipe member is supported at its opposite ends by the engine block through seal members, support of said pipe member being provided by at least one of said shaft holders.

* * * * *